(12) United States Patent
Kyouyama

(10) Patent No.: US 10,149,534 B2
(45) Date of Patent: Dec. 11, 2018

(54) LUMINAIRE AND DRAWER DEVICE

(71) Applicant: NIFCO Inc., Yokosuka-shi, Kanagawa (JP)

(72) Inventor: Takashi Kyouyama, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 30 days.

(21) Appl. No.: 15/529,768

(22) PCT Filed: Nov. 20, 2015

(86) PCT No.: PCT/JP2015/082685
§ 371 (c)(1),
(2) Date: May 25, 2017

(87) PCT Pub. No.: WO2016/084737
PCT Pub. Date: Jun. 2, 2016

(65) Prior Publication Data
US 2017/0303681 A1    Oct. 26, 2017

(30) Foreign Application Priority Data

Dec. 3, 2014    (JP) ................. 2014-244838

(51) Int. Cl.
| | |
|---|---|
| A47B 23/06 | (2006.01) |
| B60Q 3/20 | (2017.01) |
| A47B 88/00 | (2017.01) |
| F21V 33/00 | (2006.01) |
| B60N 3/10 | (2006.01) |

(Continued)

(52) U.S. Cl.
CPC ............. *A47B 23/06* (2013.01); *A47B 88/00* (2013.01); *B60N 3/102* (2013.01); *B60Q 3/20* (2017.02); *F21V 33/00* (2013.01); *A47B 97/00* (2013.01); *F21V 23/00* (2013.01)

(58) Field of Classification Search
CPC .......... F21V 33/00; A47B 23/06; A47B 88/00
USPC ....................................... 362/132
See application file for complete search history.

(56) References Cited

U.S. PATENT DOCUMENTS

2002/0136027 A1    9/2002    Hansler et al.

FOREIGN PATENT DOCUMENTS

| JP | 2002-307994 A | 10/2002 |
|---|---|---|
| JP | 2005-005275 A | 1/2005 |

(Continued)

OTHER PUBLICATIONS

PCT/ISA/210, "International Search Report for International Application No. PCT/JP2015/082685," Feb. 16, 2016.

*Primary Examiner* — Karabi Guharay
*Assistant Examiner* — Meghan Ulanday
(74) *Attorney, Agent, or Firm* — Manabu Kanesaka

(57) ABSTRACT

A luminaire is provided with a light source, and a light guide which is positioned in front of the light source. The light guide includes a first surface portion formed on the light source side, and a second surface portion formed on a side opposite the first surface portion. The first surface portion is constituted by a flat surface, and the second surface portion is constituted by an inclined surface which intersects at an angle other than a right angle against the optical axis of the light source. An angle formed between the inclined surface and the optical axis on the side of the light source is smaller on a center side of the second surface portion positioned on the optical axis, and is larger on a peripheral side of the second surface portion.

10 Claims, 11 Drawing Sheets

(51) Int. Cl.
    *A47B 97/00*     (2006.01)
    *F21V 23/00*     (2015.01)

(56) References Cited

FOREIGN PATENT DOCUMENTS

| | | |
|---|---|---|
| JP | 2005-251720 A | 9/2005 |
| JP | 2012-074192 A | 4/2012 |

LUMINAIRE AND DRAWER DEVICE

TECHNICAL FIELD

The present invention relates to a luminaire which uniformly diffuses light from a single light source in the direction perpendicular to the optical axis of the light source, and a drawer device including the luminaire.

BACKGROUND ART

In a container holder for a vehicle, a horizontally long display plate provided on the front of the drawer-type container holding member is made to emit light such that the light is guided to the display from the light source through the light guide member. (See Patent Literature 1)

When the display plate having such a length is made to emit light by a single light source, luminance on the side part of the optical axis relative to the luminance on the optical axis of the light source is reduced, and it is difficult to uniformly brighten the entire display plate.

CITATION LIST

Patent Literature

Patent Literature 1: JP 2002-307994 A

SUMMARY OF INVENTION

Technical Problem

The main object of the present invention is to provide a luminaire which uniformly diffuses light from one light source in the direction perpendicular to the optical axis of the light source, and a drawer device including the luminaire.

Solution to Problem

In order to achieve the above object, from a first aspect of the present invention, a luminaire includes a light source and a light guide positioned in front of the light source, wherein the light guide includes a first surface portion formed on the light source side, and a second surface portion formed on a side opposite the first surface portion, the first surface portion is constituted by a flat surface, the second surface portion is constituted by an inclined surface which intersects at an angle other than a right angle with respect to an optical axis of the light source, an angle formed between the inclined surface and the optical axis on the light source side is smaller on a center side of the second surface portion positioned on the optical axis, and is larger on a peripheral side of the second surface portion.

When the angle formed by the inclined surface constituting the second surface portion and the optical axis is increased on the peripheral side of the second surface portion, in the light from the light source, light which is incident from the first surface portion, then is reflected by the second surface portion, is further reflected by the first surface portion, and travels forward, that is, the light emitted from the emission part, is allowed to approach the optical axis side. Thus, the light from one light source is diffused as uniformly as possible in a direction perpendicular to the optical axis La of the light source L, and typically, the elongated display can be made to emit the light such that luminance is not different at each position across the longitudinal direction.

In one of the preferred embodiments of the present invention, the light guide includes a length and a width, one side portion in a length direction on a side of forming the second surface portion is an emission part, and the luminaire includes the second surface portion between the emission part and the other side portion along the length direction.

Moreover, in one of the preferred embodiments of the present invention, the second surface portion is formed such that its one side shape is symmetrical with the other side shape with respect to an imaginary vertical surface or horizontal surface including the optical axis.

In one of the preferred embodiments of the present invention, the second surface portion is constituted by a plurality of inclined surfaces which have different angles of inclination with respect to the optical axis of the light source.

In order to achieve the above object, from the second aspect of the present invention, a drawer device constitutes an interior component of an automobile and incorporates the luminaire, and an elongated display formed on the front surface of the drawer body constituting the drawer device is made to emit light by the emission part of the light guide.

Advantageous Effects of the Invention

The luminaire of the present invention can diffuse light as uniformly as possible from one light source in the direction perpendicular to the optical axis of the light source. In the drawer device according to the present invention, the elongated display is made to emit light such that luminance is not different at each position across the longitudinal direction.

BRIEF DESCRIPTION OF THE DRAWINGS

FIG. 4 is a longitudinal sectional block diagram of an essential part of the drawer device and shows a state in which the drawer body is completely pushed in.

DESCRIPTION OF THE EMBODIMENTS

Hereinafter, with reference to FIGS. 1 to 13, typical embodiments of the present invention will be described. A luminaire according to this embodiment, as shown in FIG. 4, light from one light source L is diffused as uniformly as possible in the direction perpendicular to the optical axis La of the light source L, and typically, an elongated display 14h is made to emit light such that luminance is not different at each position across the longitudinal direction.

The luminaire includes a light source L (Light emitting diode and bulb), and a light guide G which is positioned in front of the light source L. In the illustrated example, the light guide G is made of plastic having an optical transparency.

The light guide G includes a first surface portion 1 formed on the light source L side, and a second surface portion 2 formed on the side opposite this first surface portion 1.

Figure 11:
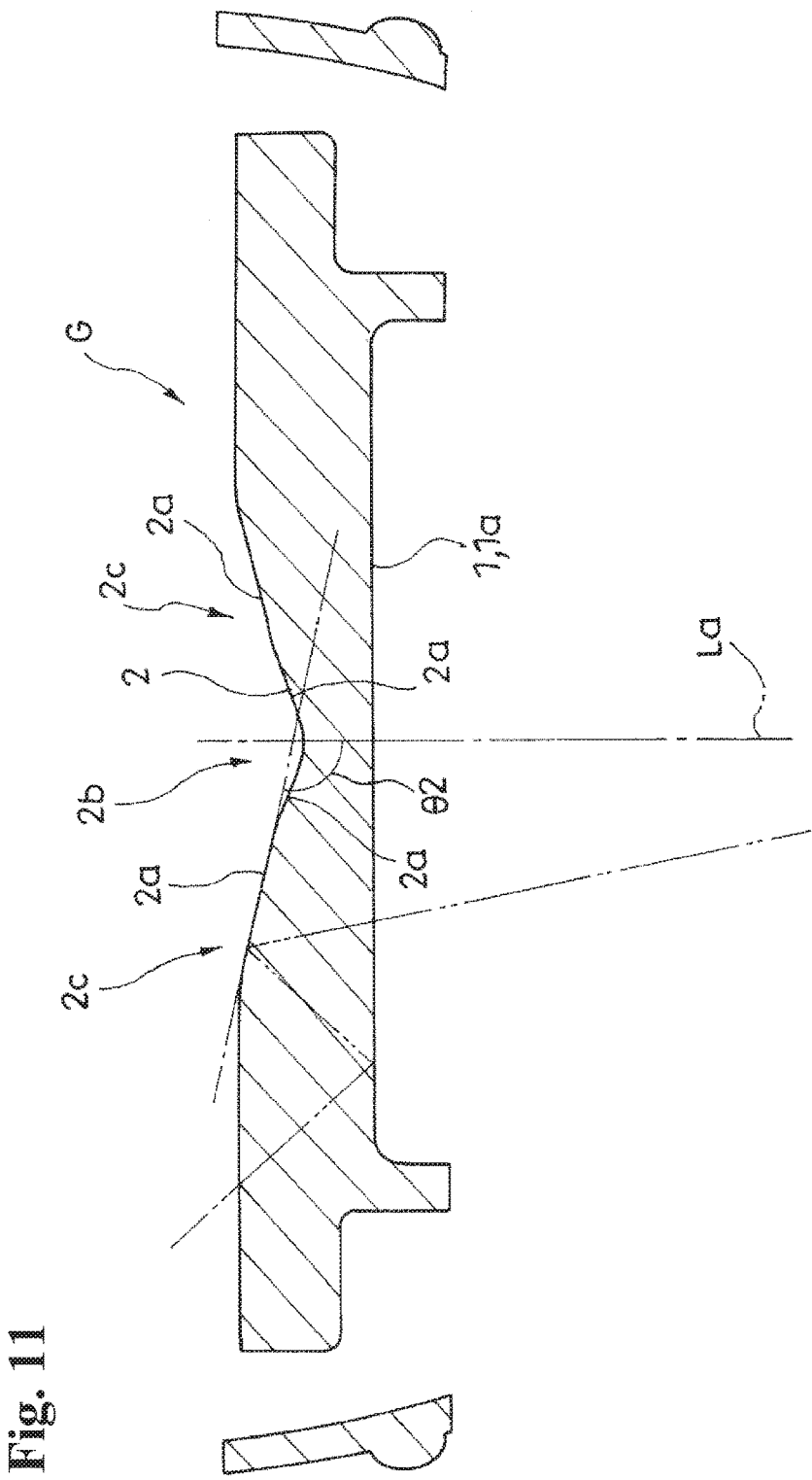
FIG. 11 is an enlarged view of the light guide in FIG. 10.

As shown in FIG. 11, the first surface portion 1 of the light guide G is constituted by a flat surface 1a, and the second surface portion 2 is constituted by an inclined surface 2a which intersects at an angle other than the right angle against the optical axis La of the light source L.

Figure 7:
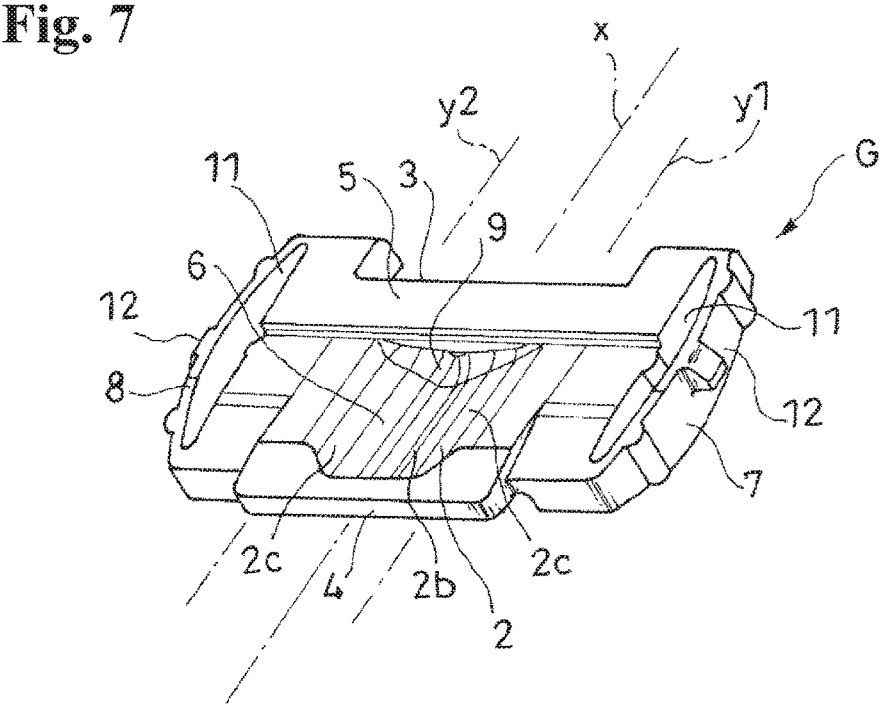
FIG. 7 is a perspective view of the light guide constituting the luminaire looking at the light guide from the second surface portion side.

In the illustrated example, the light guide G, as shown in FIG. 7, has a length and a width. One side portion 3 in the length direction on the side of forming the second surface portion 2 is an emission part 5, and the light guide G has the second surface portion 2 between the emission part 5 and the other side portion 4 in the longitudinal direction.

In the illustrated example, the emission part 5 is formed along the one side portion 3, and has a bench shape projecting forward from the second surface portion 2.

Figure 9:
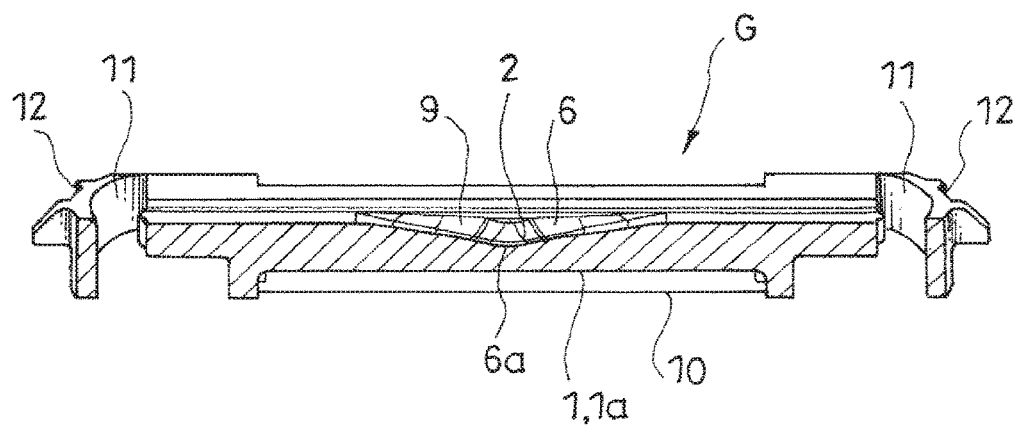
FIG. 9 is a cross-sectional view of line B-B in FIG. 6.
Figure 10:
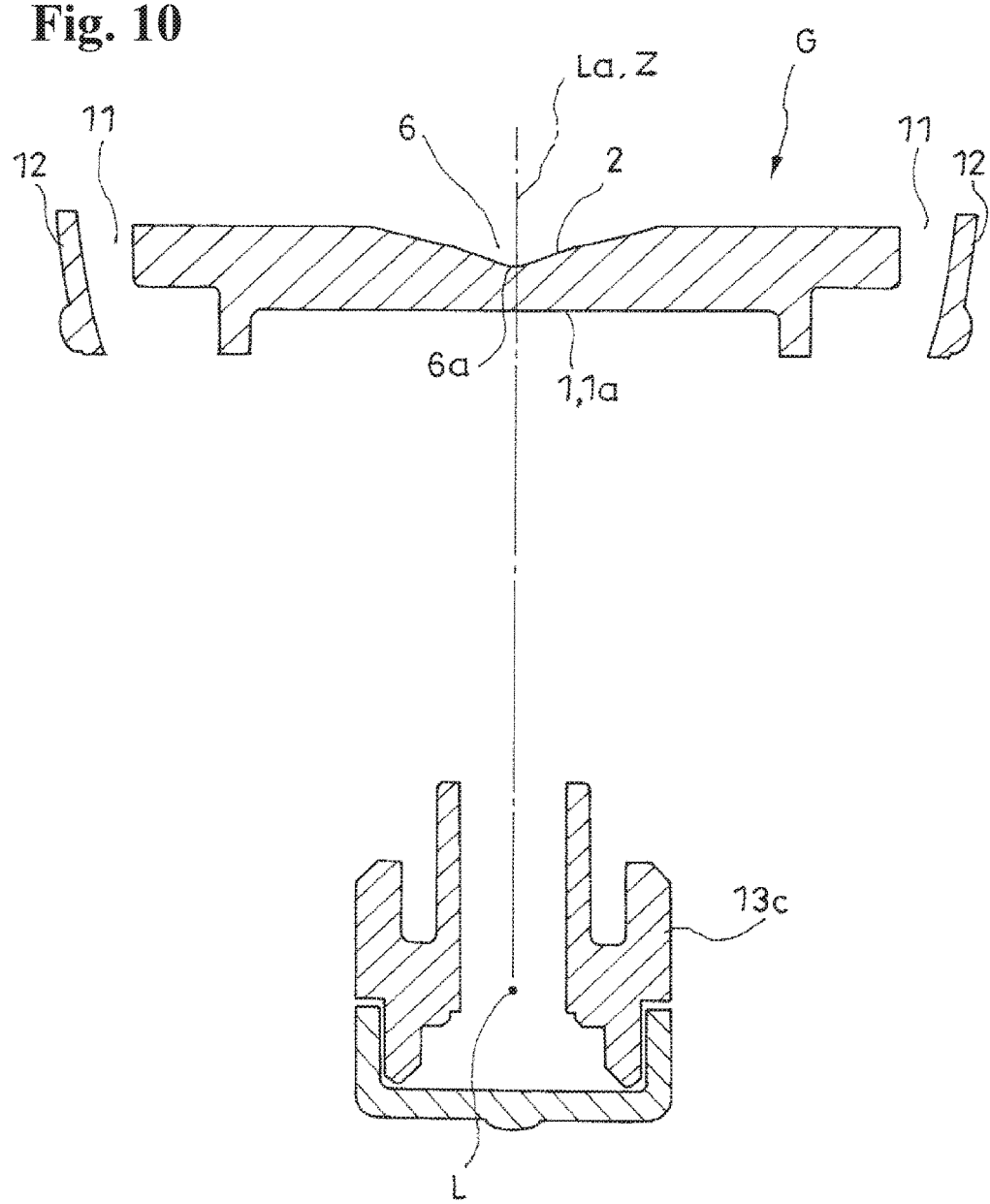
FIG. 10 is a block diagram showing a horizontal section of the essential part of the luminaire.

Further, in the illustrated example, as shown in FIG. 9, the second surface portion 2, below the emission part 5, is constituted by the inner surface of the recess 6 which has the deepest portion 6a at an approximately middle position of the longitudinal direction of the light guide G. The recess 6 is formed between a virtual first straight line y1 positioned between the imaginary center line x passing through the deepest portion 6a and bisecting the light guide G in the left and right direction, and the right side portion 7 of the light guide G, and a second straight line y2 which is positioned between the center line x and the left side portion 8 of the light guide G and is arranged such that a distance between the second straight line y2 and the center line x is equal to a distance between the first straight line y1 and the center line x. (see FIG. 7) A sectional shape of the recess 6 in the direction perpendicular to the center line x is adapted to be substantially the same at any position in the continuing direction of the center line x. Formed between the second surface portion 2 and the emission part 5 is the inclined surface 9 which inclines forward as the inclined surface 9 approaches the emission part 5.

The light guide G is disposed in front of the light source L such that the center line x is positioned on the optical axis La.

The second surface portion 2 is formed such that its one side shape is symmetrical with the other side shape with respect to the imaginary vertical flat surface z including the optical axis La. (see FIG. 10)

Further, in the illustrated example, as shown in FIG. 7, the second surface portion 2 has an increased inclined surface between a position dividing the center line x and the first straight line y1 into two and the center line x, and between a position dividing the center line x and the second straight line y2 into two and the center line x, which is on the center side of the second surface portion 2, and has a decreased inclined surface outside of the center side, which is on the peripheral side of the second surface portion 2. That is, the second surface portion 2 is constituted by a plurality of inclined surfaces 2a which have different angles of inclination with respect to the optical axis La of the light source L such that the angle formed between the inclined surface 2a and the optical axis La on the side of the light source L is larger on the center side of the second surface portion 2 positioned on the optical axis La (θ1, FIG. 12), and is smaller on the peripheral side of the second surface portion 2 (θ2, FIG. 11).

Figure 8:
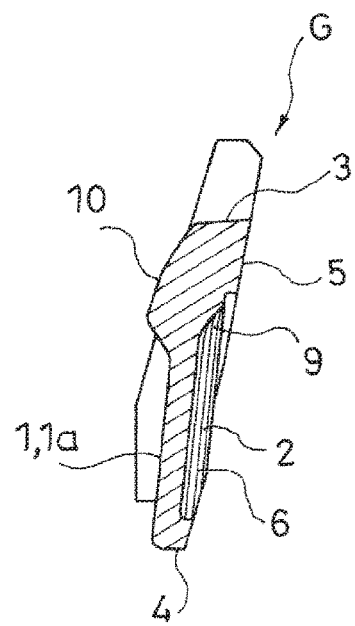
FIG. 8 is a cross-sectional view at line A-A in FIG. 6.

On the other hand, as shown in FIG. 8, the light guide G, on the side of forming the first surface portion 1 has a bench-like raised portion 10 along the one side portion 3 behind the emission part 5. The first surface portion 1 is formed between the bench-like raised portion 10 and the other side portion 4 of the light guide G. In other words, in front of the first surface portion 1, which is the flat surface 1a, the second surface portion 2 constituted by the inclined surface 2a is formed.

When the angle formed by the inclined surface 2a constituting the second surface portion 2 and the optical axis La is increased on the peripheral side of the second surface portion 2, of the light from the light source L, light which is incident from the first surface portion 1, then is reflected by the second surface portion 2, is further reflected by the first surface portion 1, and travels forward, that is, the light emitted from the emission part 5, is allowed to approach the optical axis La side. (In FIG. 11 such light is shown by the two-dot chain line.) Thus, the light from one light source L is diffused as uniformly as possible in a direction perpendicular to the optical axis La of the light source L, and typically, the elongated display 14h can be made to emit light such that luminance is not different at each position across the longitudinal direction.

Figure 12:
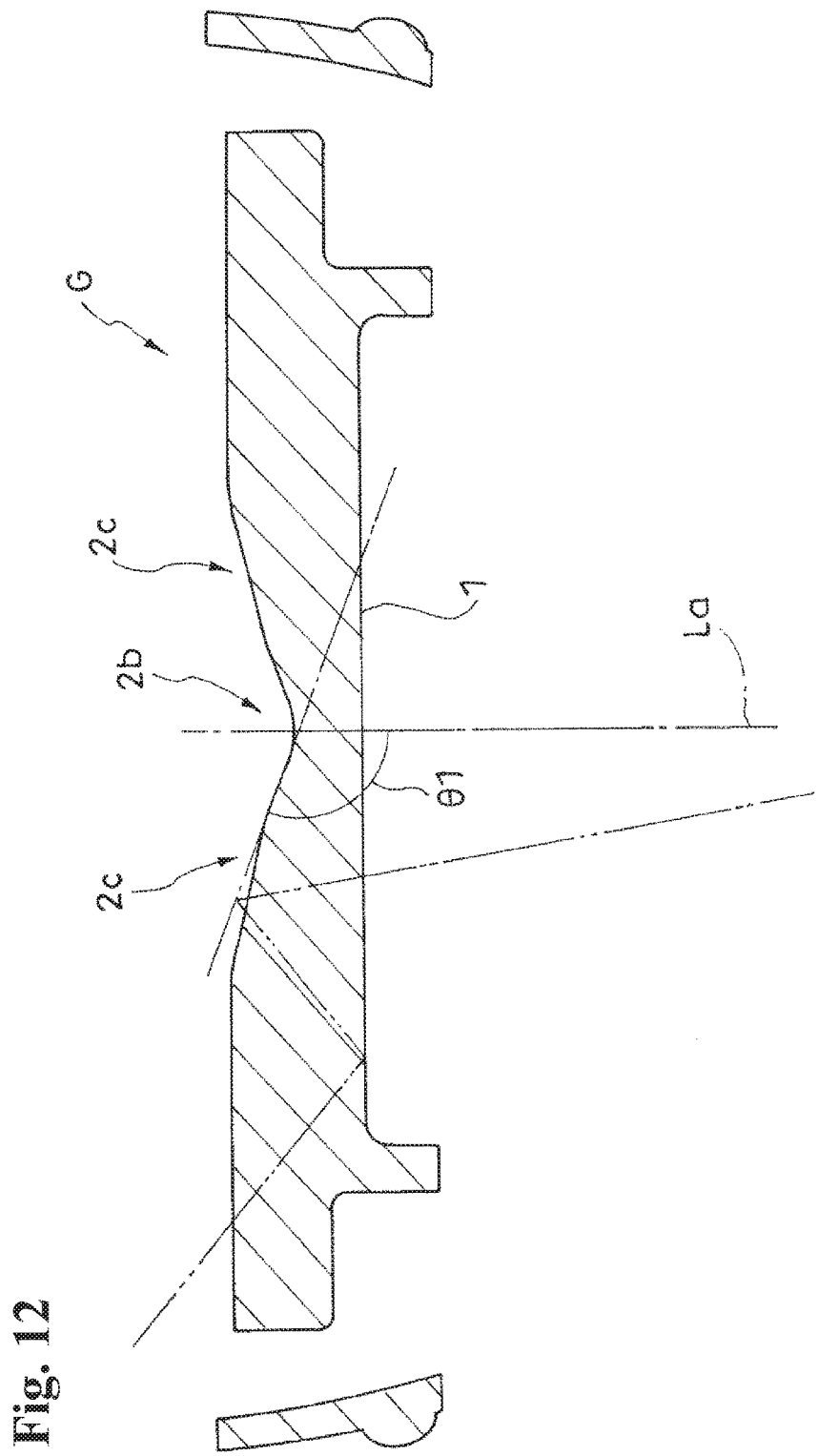
FIG. 12 is an enlarged view of a light guide in FIG. 10.

Supposing an inclination of the inclined surface 2a on the peripheral side of the second surface portion 2 is equal to an inclination of the inclined surface 2a on the center side, as indicated by the two-dot chain line in FIG. 12, of the light from the light source L, the pass of the light which is incident from the first surface portion 1, then is reflected by the second surface portion 2, is further reflected by the first surface portion 1, and travels forward is away from the optical axis La side. Therefore, the elongated display 14h, which is made to emit light, reduces luminance at its end side.

Although the illustration is omitted, the recess 6 can be configured to include the deepest portion 6a in a point shape, the circular area centered on the deepest portion 6a can be defined as the center side 2b of the second surface portion 2 constituted by the inclined surface 2a having a large inclination, and the ring-like area surrounding the center side 2b can be defined as the peripheral side 2c of the second surface portion 2 constituted by the inclined surface 2a having a small inclination. In this case, effects shown in FIG. 11 can be obtained in the entire circumferential direction around the optical axis La.

In the illustrated example, the luminaire is built in the drawer device H which constitutes an interior component of an automobile, and is part of the drawer device H.

Figure 1:
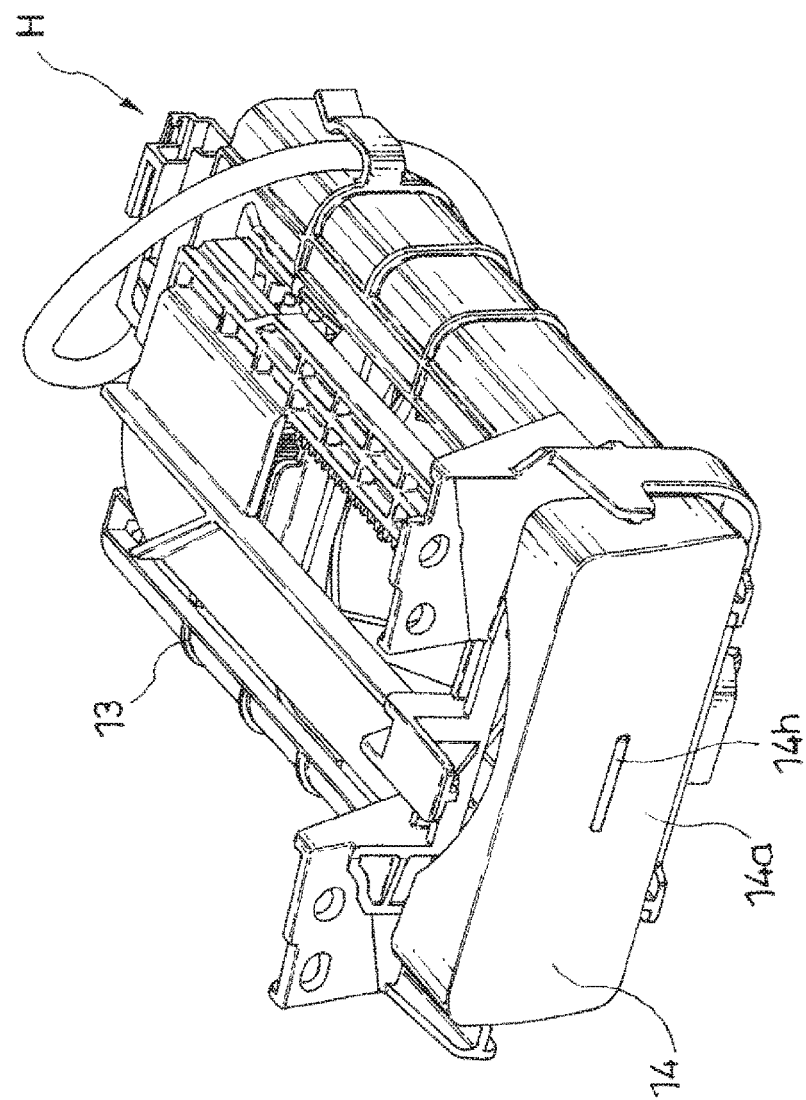
FIG. 1 is a perspective view of the drawer device which incorporates a luminaire according to an embodiment of the present invention and shows a state in which the drawer body is completely housed.
Figure 2:
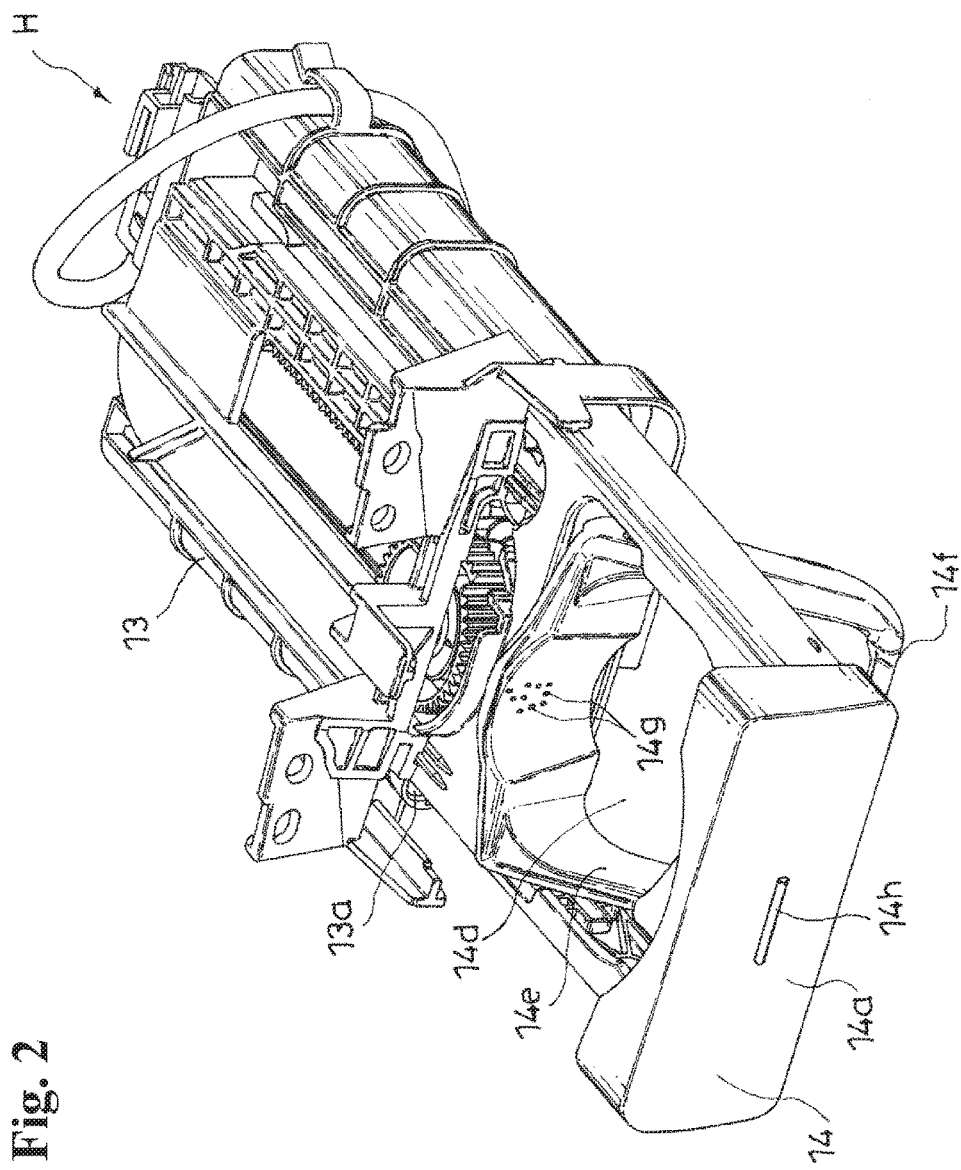
FIG. 2 is a perspective view of the drawer device and shows a state in which the drawer body is pulled out.

In the illustrated example, as shown in FIG. 2, the drawer device H includes a main body 13 provided with a horizontally long front opening 13a, and a drawer body 14 having a horizontally long lid portion 14a for closing the front opening 13a at a position where it can be housed movably back and forth in the main body 13 and pushed into the main body 13 at the front end.

Figure 3:
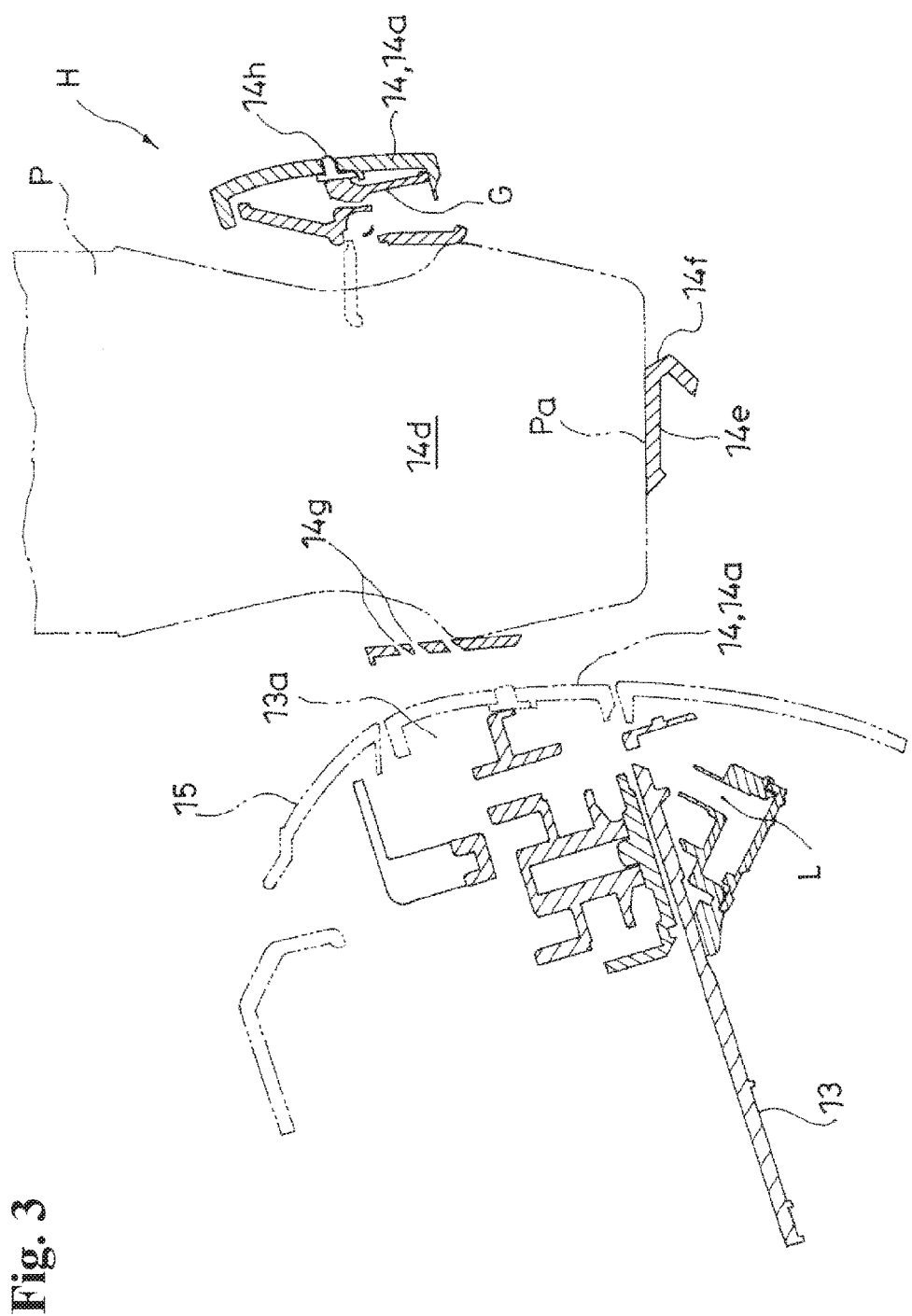
FIG. 3 is a longitudinal sectional block diagram showing a state in which the drawer device is used, wherein the two-dot chain line shows a lid of the drawer body which is in a completely pushed-in position, an instrument panel, and a beverage container.
Figure 4:
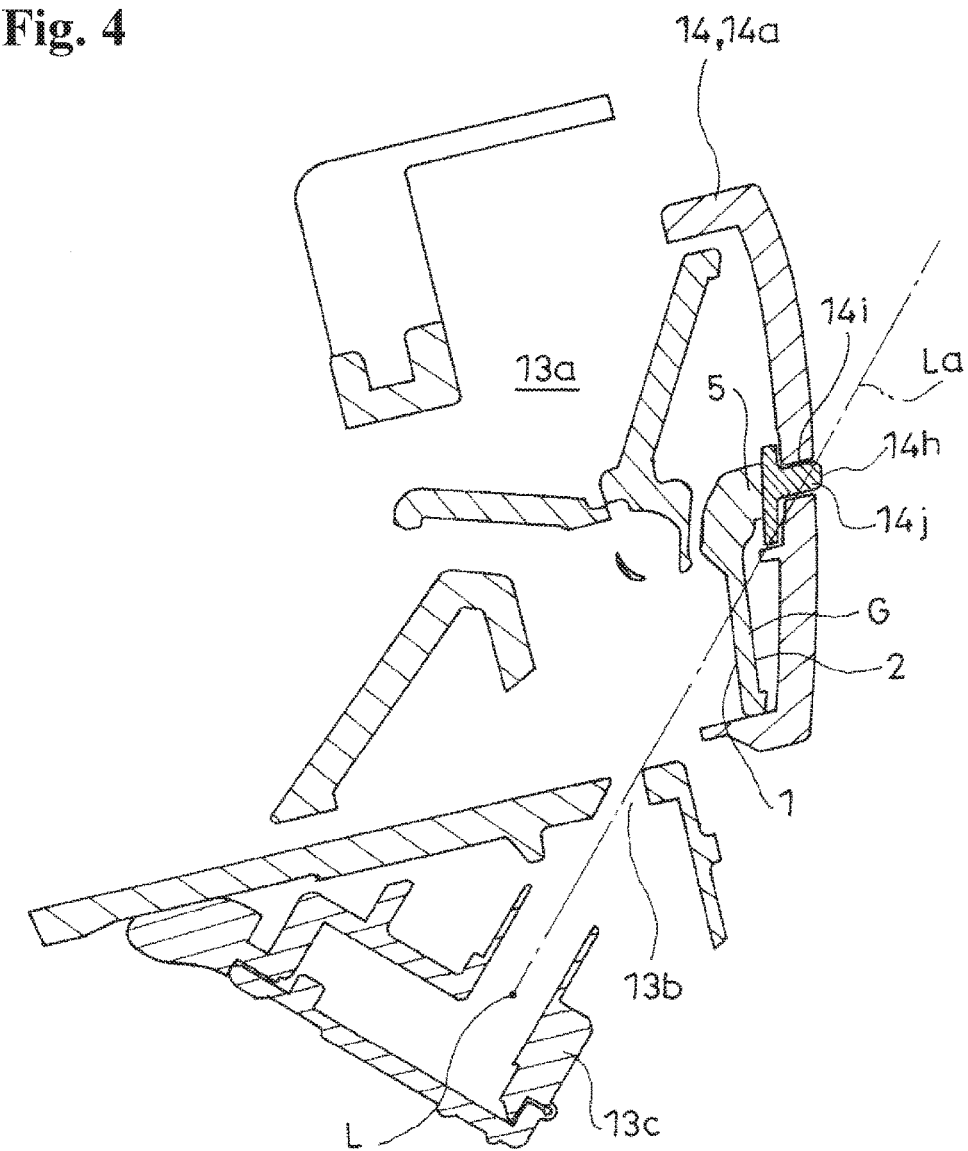

Typically, as shown in FIG. 3, the drawer device H is used such that the main body 13 is placed inside the instrument panel 15, and the lid portion 14a forms a part of the decorative surface of the instrument panel 15 at a position where the drawer body 14 is pushed in.

In the illustrated example, the drawer body 14 is configured to have a frame shape behind the lid 14a such that at a position drawn out from the main body 13, the beverage container P can be housed in the in-frame space 14d from above.

Further, in the in-frame space 14d, when the drawer body 14 is pulled out from the main body 13, a support member 14e is provided to pivot from a horizontal position accommodated in the frame space 14d to a deployed position where the front end 14f is positioned under the frame space 14d, and the bottom portion Pa of the beverage container P accommodated in the in-frame space 14d as described above is supported by the front end 14f of the support member 14e in the deployed position. (FIG. 3) That is, in the illustrated example, the drawer device H is adapted to constitute a cup holder.

In the illustrated example, the above light source L (Specific illustration of the light source L will be omitted.) is provided outside the lower surface of the main body 13 such that the above light source L emits light obliquely upward through the through hole 13b, which is positioned in the middle of the front opening 13a of the main body 13 in the lateral direction and formed in the main body 13 below the front opening 13a as shown in FIG. 4. Reference numeral 13c is a holder of the light source L.

The elongated display 14h made of a through hole 14i which is closed by the translucent member 14j is formed on the front face of the drawer body 14, which is the lid portion 14a in the illustrated example, constituting the drawer device H. The light guide G is attached to the back side of the lid 14a such that the emission part 5 is positioned behind the display 14h. In the illustrated example, at a position where the drawer body 14 is pushed into the main body 13, light of the light source L is incident from the first surface portion 1 side of the light guide G, is diffused in the light guide G, and is emitted forward from the emission part 5 of the light guide G. Thus, at the position where the drawer body 14 is pushed into the main body 13, the display 14h is made to emit light (FIG. 4). In the illustrated example, as shown in FIG. 2, at a position where the drawer body 14 is pulled out, light of the light source L is adapted to leak through a plurality of small holes 14g . . . 14g which are formed on the rear end side of the support member 14e, and as a result, the position in which the beverage container P is held by the cup holder can be easily visually recognized in the nighttime or the like.

Figure 5:
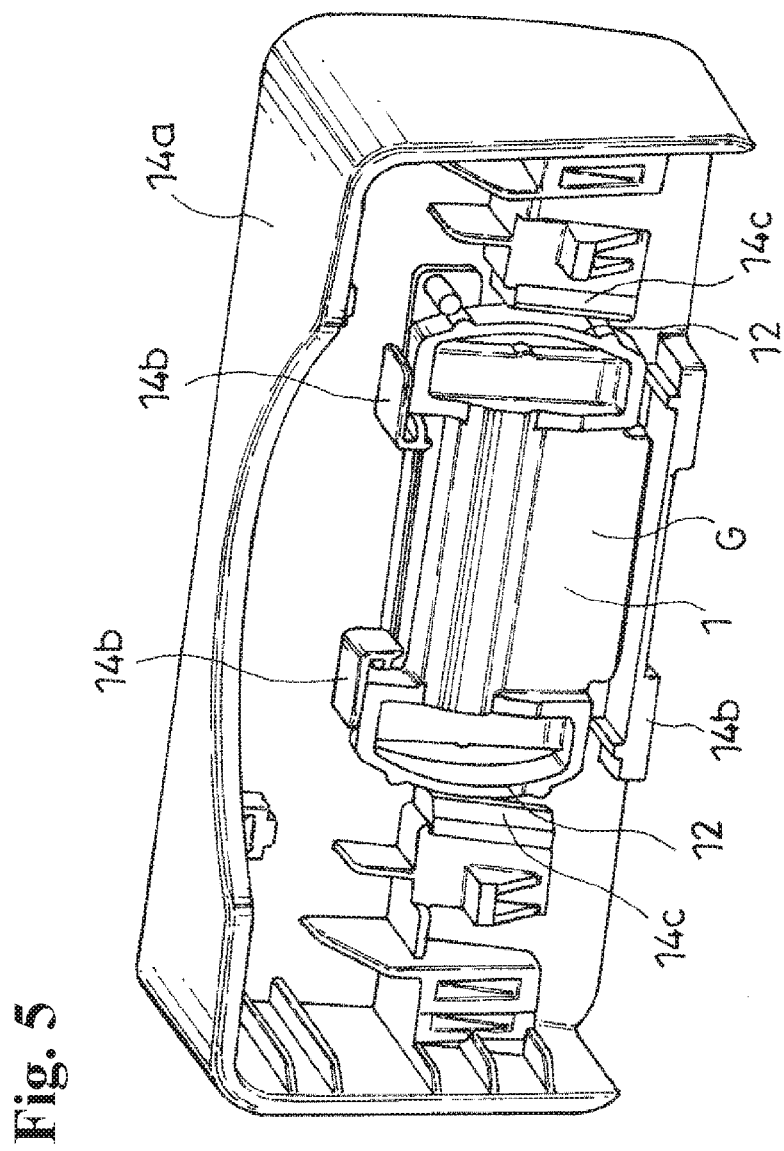
FIG. 5 is a perspective view of the drawer device looking at the lid constituting the drawer device from the back.
Figure 6:
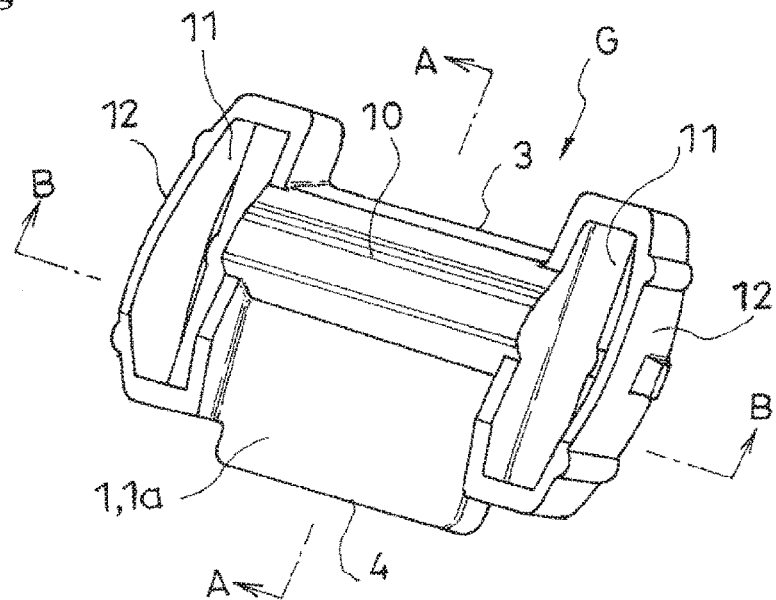
FIG. 6 is a perspective view of the light guide constituting the luminaire looking at the light guide from the first surface portion side.

In the illustrated example, light guide G, as shown in FIG. 7, has a through hole 11 in the form of a long hole shape along the width direction between two side portions 7 and 8 along the width direction and the second surface portion 2. The portion that is positioned outside of the through hole 11 has a resiliently deformable portion 12. As shown in FIG. 5, on the back side of the lid portion 14a, vertical retaining walls 14b and 14b are disposed apart from each other with the distance substantially equal to the width dimension of the light guide G, and right and left retaining walls 14c and 14c are disposed apart from each other with the distance which is slightly smaller than the length of the light guide G. The light guide G is fitted into the space surrounded by the retaining walls 14b . . . 14c while elastically deforming the resiliently deformable portion 12, and is attached to the back side of the lid portion 14a.

Figure 13:
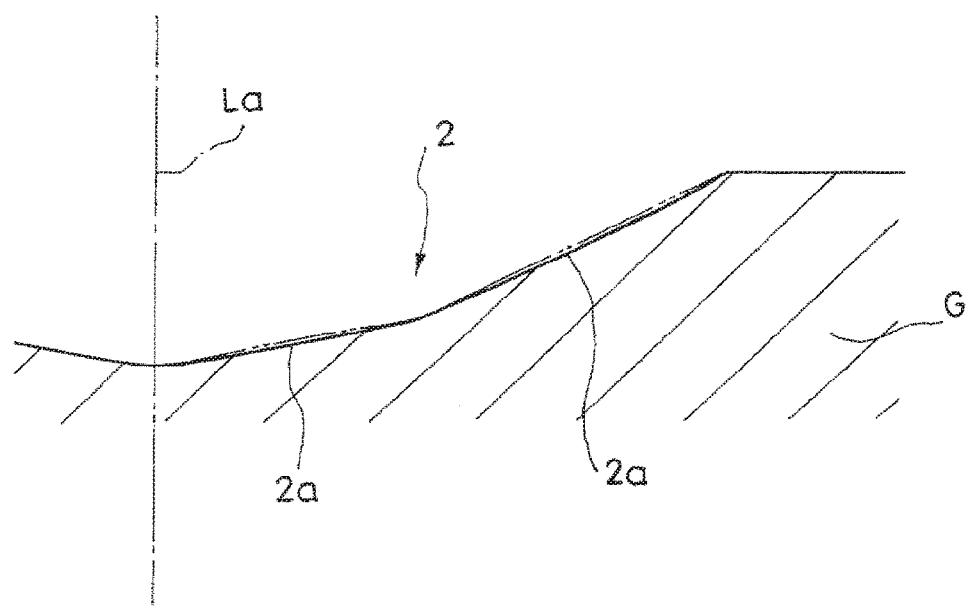
FIG. 13 is an enlarged view of another configuration example of the essential part of the second surface portion of the light guide.

As shown in FIG. 13, the inclined surface 2a constituting the second surface portion 2 can be a concave curved surface instead of being the inclined flat surface indicated by the two-dot chain line in FIG. 13. The second surface portion 2 can be also configured with the only concave curved surface or a combination with an inclined flat surface and the concave surface.

Obviously, the present invention is not limited to the above-explained embodiments, and includes all embodiments which can obtain the object of the present invention.

REFERENCE SIGNS LIST

L light source
La optical axis
G light guide
1 first surface portion
1a flat surface
2 second surface portion
2a inclined surface All contents of the specification, claims, drawings, and abstract of Japanese Patent Application No. 2014-241704 filed on Nov. 28, 2014, and Japanese Patent Application No. 2014-244838 filed on Dec. 3, 2014 are cited in their entireties herein and are incorporated as a disclosure of the specification of the present invention.

The invention claimed is:

1. A luminaire comprising:
   a light source; and
   a light guide positioned in front of the light source, and including a first surface portion formed on a light source side, and a second surface portion formed on a side opposite to the first surface portion,
   wherein the first surface portion includes a flat surface portion, and
   the second surface portion includes a recess portion symmetrically recessed with respect to a center line of the recess portion intersecting with an optical axis of the light source, and having first inclined surfaces, each of the first inclined surfaces linearly and outwardly extending from the center line and inclined at a first inclined angle with respect to the optical axis of the light source, and second inclined surfaces, each of the second inclined surfaces continuously and linearly extending from each of the first inclined surfaces to each of two side ends of the recess portion and inclined at a second inclined angle different from the first inclined angle with respect to the optical axis of the light source.

2. The luminaire according to claim 1, wherein the light guide further comprises an emission part formed at an upper portion of the light guide on a side of the second surface portion and extending in a length direction intersecting with the center line of the recess portion, and
   the recess portion is located under the emission part.

3. The luminaire according to claim 1, wherein the recess portion is symmetrical with a plane including the center line of the recess portion.

4. The luminaire according to claim 1, wherein the second surface portion further includes a plurality of inclined surfaces which has inclined angles different from each other with respect to the optical axis of the light source.

5. A drawer device constituting an interior component of an automobile, comprising:
   the luminaire according to claim 1,
   a drawer body, and an elongated display formed on a front surface of the drawer body and emitted by an emission part of the light guide.

6. The drawer device according to claim 5, wherein the drawer body includes a lid portion arranged at the front surface of the drawer body and having the elongated display, and a support member attached to the lid portion at a rear side of the lid portion and having a plurality of holes at a rear surface of the support member; and the luminaire is attached to a rear surface of the elongated display, and light from the light source emits the plurality of holes when the drawer body is pulled out, and the center line of the recess portion is inclined with respect to the optical axis of the light source such that light from the light source is obliquely incident on the flat surface portion of the first surface portion.

7. The luminaire according to claim 1, wherein the light guide is arranged at a position apart from the light source, and the first inclined angle is larger than the second inclined angle with respect to the optical axis of the light source.

8. The luminaire according to claim 1, wherein the light guide further comprises an emission part projecting outwardly from the second surface portion above the recess portion, and the recess portion has an upper end portion inclined outwardly in a direction approaching the emission part.

9. The luminaire according to claim 8, wherein the light guide further comprises a raised portion projecting outwardly from the first surface portion at a position corresponding to the emission part in a direction opposite to the emission part, and the flat surface portion is arranged under the raised portion.

10. The luminaire according to claim 1, wherein the center line of the recess portion is inclined with respect to the optical axis of the light source such that light from the light source is obliquely incident on the flat surface portion of the first surface portion.

* * * * *